United States Patent
Siegumfeldt et al.

(10) Patent No.: US 9,497,541 B2
(45) Date of Patent: Nov. 15, 2016

(54) AUDIO SYSTEM FOR AUDIO STREAMING AND ASSOCIATED METHOD

(71) Applicant: GN ReSound A/S, Ballerup (DK)

(72) Inventors: Peter Siegumfeldt, Frederiksberg (DK); Ole Gudiksen, Farum (DK)

(73) Assignee: GN RESOUND A/S, Ballerup (DK)

( * ) Notice: Subject to any disclaimer, the term of this patent is extended or adjusted under 35 U.S.C. 154(b) by 116 days.

(21) Appl. No.: 13/849,468

(22) Filed: Mar. 22, 2013

(65) Prior Publication Data

US 2014/0241545 A1 Aug. 28, 2014

(30) Foreign Application Priority Data

Feb. 28, 2013 (DK) .................................. 2003 70119
Feb. 28, 2013 (EP) ..................................... 13157297

(51) Int. Cl.
*H04B 3/00* (2006.01)
*H04R 3/00* (2006.01)
(Continued)

(52) U.S. Cl.
CPC . *H04R 3/00* (2013.01); *H04B 5/00* (2013.01); *H04R 25/554* (2013.01); *H04R 2225/55* (2013.01)

(58) Field of Classification Search
CPC ........ H04R 25/00; H04R 27/00; H04B 3/00; H04B 5/00; H04B 5/0006; H04B 25/554; H04B 2225/55
USPC ..................... 381/312–316, 320–321, 77–83
See application file for complete search history.

(56) References Cited

U.S. PATENT DOCUMENTS

| 7,995,756 B1 | 8/2011 | McKinney et al. |
| 8,600,530 B2 * | 12/2013 | Nagle et al. .................... 700/94 |
| 2002/0124097 A1 | 9/2002 | Isely et al. |

(Continued)

FOREIGN PATENT DOCUMENTS

| EP | 2 015 603 A1 | 1/2009 |
| JP | 2004126577 | 4/2004 |

(Continued)

OTHER PUBLICATIONS

Japanese Office Action dated Sep. 9, 2014, for related JP Patent Application No. 2014-029882, 3 pages.

(Continued)

*Primary Examiner* — Disler Paul
(74) *Attorney, Agent, or Firm* — Vista IP Law Group, LLP (57) ABSTRACT

A method for operating an audio system for transmitting wireless audio streams to a hearing system, the wireless audio streams comprising a first audio stream and a second audio stream, the audio system comprising a communication unit and a radio system comprising stationary transmitter units for transmitting at least the first audio stream with first audio identification data indicative of the first audio stream and the second audio stream with second audio identification data indicative of the second audio stream, the stationary transmitter units including a first transmitter unit and a second transmitter unit, the method includes: receiving a request indicative of an audio track; determining configuration data based on the request indicative of the audio track; and transmitting the configuration data to the hearing system for allowing the hearing system to receive one of the first and second audio streams representative of the audio track indicated in the request.

28 Claims, 5 Drawing Sheets

(51) Int. Cl.
*H04B 5/00* (2006.01)
*H04R 25/00* (2006.01)

(56) References Cited

U.S. PATENT DOCUMENTS

| | | | |
|---|---|---|---|
| 2003/0055901 A1 | 3/2003 | Smith, Jr. et al. | |
| 2006/0046651 A1 | 3/2006 | Hazell et al. | |
| 2006/0274747 A1 | 12/2006 | Duchscher et al. | |
| 2007/0133832 A1* | 6/2007 | DiGiovanni et al. | 381/320 |
| 2007/0156268 A1* | 7/2007 | Galvin et al. | 700/94 |
| 2007/0162395 A1 | 7/2007 | Ben-Yaacov et al. | |
| 2008/0080394 A1 | 4/2008 | Platz et al. | |
| 2008/0175421 A1 | 7/2008 | Chizari | |
| 2008/0205664 A1 | 8/2008 | Kim et al. | |
| 2010/0067723 A1 | 3/2010 | Bergmann et al. | |
| 2010/0158292 A1 | 6/2010 | Pedersen | |
| 2010/0190532 A1 | 7/2010 | Sampat et al. | |
| 2011/0129106 A1 | 6/2011 | Hasler et al. | |
| 2011/0188662 A1 | 8/2011 | Jensen et al. | |
| 2011/0249842 A1 | 10/2011 | Solum et al. | |
| 2011/0319018 A1 | 12/2011 | Kroman | |
| 2012/0021707 A1* | 1/2012 | Forrester et al. | H04W 52/281 455/103 |
| 2012/0189140 A1* | 7/2012 | Hughes | H04M 3/56 381/123 |
| 2012/0213393 A1 | 8/2012 | Foo et al. | |
| 2013/0322648 A1* | 12/2013 | Chukka | H04L 65/60 381/77 |
| 2014/0079241 A1* | 3/2014 | Chan | H04H 20/86 381/77 |

FOREIGN PATENT DOCUMENTS

| | | | |
|---|---|---|---|
| WO | | 2007/139293 A1 | 12/2007 |
| WO | | 2011/027004 A2 | 3/2011 |
| WO | WO 2013/100933 A1 | | 7/2013 |

OTHER PUBLICATIONS

Japanese Office Action dated Sep. 9, 2014, for related JP Patent Application No. JP 2014-029867, 3 pages.
First Technical Examination and Search Report dated Oct. 8, 2013 for DK Patent Application No. PA 2013 70119, 4 pages.
Extended European Search Report dated Jun. 21, 2013 for EP Patent Application No. 13157293.5.
Extended European Search Report dated Jun. 11, 2013 for EP Patent Application No. 13157297.6.
First Technical Examination and Search Report dated Oct. 11, 2013 for DK Patent Application No. PA 2013 70120, 5 pages.
Second Technical Examination dated May 1, 2014 for related DK Patent Application No. PA 2013 70120, 2 pages.
Third Technical Examination dated May 26, 2014 for related DK Patent Application No. PA 2013 70120, 2 pages.
Second Technical Examination—Intention to Grant dated Apr. 29, 2014 for related DK Patent Application No. PA 2013 70119, 2 pages.
First Examination dated Mar. 27, 2015 for related EP Patent Application No. 13157297.6.
Non-final Office Action dated Apr. 1, 2014 for U.S. Appl. No. 13/849,036.
"Wi-Fi and Bluetooth—interference issues," HP, Jan. 2002, pp. 1-5.
Advisory Action dated Dec. 2, 2015 for U.S. Appl. No. 13/849,036.
Final Office Action dated Aug. 10, 2015 for U.S. Appl. No. 13/849,036.
Listen Tech ("Listen") "LT-800 Stationary Transmitter" Oct. 21, 2005, pp. 1-4.
Non-final Office Action dated Apr. 1, 2016 for related U.S. Appl. No. 13/849,036.
Phonak, "Theaters and Concert Halls—Solutions for the hearing impaired." pp. 1-12, 2008.
Phonak, "Phonak ComPilot—User Guide." pp. 1-88, 2012.
Notice of Allowance and Fee(s) due dated Aug. 23, 2016 for related U.S. Appl. No. 13/849,036.

* cited by examiner

AUDIO SYSTEM FOR AUDIO STREAMING AND ASSOCIATED METHOD

RELATED APPLICATION DATA

This application claims priority to and the benefit of Danish Patent Application No. PA 2013 70119, filed on Feb. 28, 2013, pending, and European Patent Application No. 13157297.6, filed on Feb. 28, 2013, pending. The disclosures of both of the above applications are expressly incorporated by reference in their entireties herein.

FIELD

An embodiment described herein relates to a method for operating an audio system for transmitting wireless audio streams. Further, an audio system for transmitting wireless audio streams is provided. In particular, a method and audio system for transmitting wireless audio streams to hearing system(s) are provided.

BACKGROUND

Wireless communication to and from hearing devices has been increasing in continuation of the developments within wireless communication technology. In a crowded environment where audio is distributed to the crowd, for example in an airport or in a movie theatre, it is known to stream audio via a telecoil solution having a limited bandwidth with limited possibilities of separating different audio streams.

Further, audio streams from neighboring broadcasting areas, such as cinema auditoriums of a cinema complex, may overlap requiring a receiver device to be able to separate and distinguish between audio streams.

SUMMARY

Despite the known solutions there is still a need to personalize and listen to different audio streams that are transmitted wirelessly in a crowded environment.

There is also a need for a user of a hearing system to be able to in a simple and effective manner personalize and select desired audio streams.

Accordingly, an audio system for audio streaming is provided, the audio system comprising a radio system comprising one or a plurality of stationary transmitter units configured to transmit at least a first audio stream with first audio identification data indicative of the first audio stream and configured to transmit at least a second audio stream with second audio identification data indicative of the second audio stream. The plurality of transmitter units includes a first transmitter unit and a second transmitter unit and the audio system comprises a communication unit for transmitting configuration data for the hearing system. The communication unit is configured to receive a request indicative of at least one audio track; determine configuration data for the hearing system, e.g. based on the request indicative of at least one audio track; and transmit the configuration data to the hearing system for allowing or enabling the hearing system to receive at least one audio stream representative of the audio track indicated in the request.

Also disclosed is a method for operating an audio system for transmitting wireless audio streams to a hearing system, wherein an audio stream is an electromagnetic signal representative of an audio track. The audio system comprises a communication unit and a radio system comprising one or a plurality of stationary transmitter units for transmitting at least a first audio stream with first audio identification data indicative of the first audio stream and optionally a second audio stream with second audio identification data indicative of the second audio stream. The plurality of stationary transmitter units includes a first transmitter unit and a second transmitter unit. The method comprises receiving, e.g. in the communication unit, a request indicative of at least one audio track; determining configuration data for the hearing system e.g. based on the request indicative of at least one audio track; and transmitting the configuration data to the hearing system for allowing or enabling the hearing system to receive at least one audio stream representative of the audio track indicated in the request.

The method and audio system provides simple configuration of hearing device receivers for effective audio streaming in multi-stream environments such as airports or cinema complexes. Further, the method and audio system enable power saving in hearing devices by reducing the requirements for data sent from the hearing device.

A method for operating an audio system for transmitting wireless audio streams to a hearing system, the wireless audio streams comprising a first audio stream and a second audio stream, the audio system comprising a communication unit and a radio system comprising a plurality of stationary transmitter units for transmitting at least the first audio stream with first audio identification data indicative of the first audio stream and the second audio stream with second audio identification data indicative of the second audio stream, the plurality of stationary transmitter units including a first transmitter unit and a second transmitter unit, the method includes: receiving a request indicative of an audio track; determining configuration data for the hearing system based on the request indicative of the audio track; and transmitting the configuration data to the hearing system for allowing the hearing system to receive one of the first and second audio streams representative of the audio track indicated in the request.

Optionally, the act of transmitting the configuration data to the hearing system may comprise transmitting the configuration data to a hearing device of the hearing system.

Optionally, the act of transmitting the configuration data to the hearing system may comprise transmitting the configuration data at a frequency anywhere from 2.4 GHz to 2.5 GHz, at a frequency anywhere from from 800 MHz to 1 GHz, and/or at a frequency anywhere from 13 MHz to 14 MHz.

Optionally, the configuration data may comprise at least a part of an audio identification data of one of the first and second audio streams representative of the audio track indicated in the request.

Optionally, the audio identification data may comprise one or more of transmitter identification data, transmitter group identification data, audio group identification data, audio type identification data, and audio protocol identification data.

Optionally, the configuration data may comprise first configuration data for a first hearing system model or type, and second configuration data for a second hearing system model or type.

Optionally, the request indicative of the audio track may comprise hearing system data.

Optionally, the act of transmitting configuration data to the hearing system may comprise transmitting the configuration data to an accessory device of the hearing system.

Optionally, the accessory device may comprise a mobile phone, a tablet computer, a smart phone, a hearing device remote control unit, or a key card.

An audio system for transmitting wireless audio streams to a hearing system, includes: a radio system comprising a plurality of stationary transmitter units configured to transmit at least a first audio stream with first audio identification data indicative of the first audio stream, and a second audio stream with second audio identification data indicative of the second audio stream, the plurality of transmitter units including a first transmitter unit and a second transmitter unit; and a communication unit for transmitting configuration data for the hearing system, wherein the communication unit is configured to: receive a request indicative of an audio track; determine configuration data for the hearing system based on the request indicative of the audio track; and transmit the configuration data to the hearing system for allowing the hearing system to receive one of the first and second audio streams representative of the audio track indicated in the request.

Optionally, the communication unit may comprise a wireless transmitter for transmitting the configuration data to a hearing device of the hearing system.

Optionally, the communication unit may comprise a near field communication device configured to transmit the configuration data based on the request indicative of the audio track to the hearing system.

Optionally, the radio system may comprise a radio system control unit connected to the transmitter units, and wherein the radio system control unit is configured to control the transmitter units.

Optionally, the audio system may further include a user interface unit connected to the communication unit, wherein the user interface unit is configured to receive the request indicative of the audio track, and transmit the received request to the communication unit.

Optionally, the communication unit may be configured to transmit the configuration data based on the request indicative of the audio track to an accessory device of the hearing system.

Optionally, at least one of the stationary transmitter units may be configured to transmit one of the first and second audio streams in a form of electromagnetic signals representative of the audio track.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings are not to be considered limiting in the scope of the claims.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

The disclosed audio system and method allows the radio system to broadcast several audio streams, each audio stream having different audio identification data. By the present method a hearing system is able to search for and receive only a desired audio stream. Upon receipt of a request indicative of an audio track, the communication unit determines and transmits configuration data indicative of at least one audio stream representative of the audio track requested to the hearing system, allowing the hearing system to play the audio track requested.

The hearing system may comprise a hearing device and optionally an accessory device. Thus, transmitting configuration data to the hearing system may comprise transmitting configuration data to a hearing device and/or an accessory device of the hearing system. Transmitting configuration data to the hearing system may comprise transmitting configuration data as an email, a text message, e.g. an SMS. The hearing device of the hearing system may comprise a processor configured to compensate for hearing loss or disability of the hearing device user.

The configuration data may allow or enable a hearing system to setup or control the wireless receiver of the hearing device in order to receive or listen for audio stream(s) representative of the requested audio track.

An audio track is an audible signal, such as an airport call, a movie sound track, speech, and/or a piece of music.

An audio stream is an electromagnetic signal representative of an audio track. A transmitter sends one or more audio streams. An audio stream comprises audio stream data and audio identification data, the audio stream data being representative of an audio track. Audio identification data (audio ID) is data enabling identification of or used for identification of a specific audio stream.

Audio identification data (audio ID) may comprise one or more of transmitter ID, transmitter group ID, audio group ID, audio type ID, and audio protocol ID.

Transmitter identification data (transmitter ID) is data enabling identification of or used for identification of a specific transmitter of the radio system.

Transmitter group identification data (transmitter group ID) is data enabling identification of or used for identification of a group of transmitters of the radio system. A group of transmitters comprises a plurality of transmitters. Transmitters may be grouped based on audio track, position within a selected area, etc. A first group of transmitters may be formed by transmitters streaming the same audio track but with different audio ID.

Audio group identification data (audio group ID) is data enabling identification of or used for identification of a group of audio streams relevant for the user of the hearing system. Audio group ID may comprise data indicative of audio track or parts of an audio track (audio track ID). Audio group ID may comprise data indicative of language.

Audio type identification data (audio type ID) is data enabling identification of or used for identification of audio type. Audio type ID may be representative of hearing device models/manufacturers able to listen to the audio stream in question.

Audio protocol identification data (audio protocol ID) is data enabling identification of or used for identification of audio protocol, such as encoding format, frequencies, key for decrypting or decoding the audio streams, or other physical properties of an audio stream.

An audio track (e.g. a movie sound track) may be broadcasted using a group of a plurality of transmitter units, i.e. a plurality of transmitter units may transmit the same audio stream data with different audio ID. A plurality of transmitter units streaming the same audio stream data increases the capacity and increase the possibility of a receiver to receive a reliable signal. Each transmitter unit of the group of transmitter units broadcasts an audio stream identifiable by audio ID. The group of transmitter units may be identified by common transmitter group ID broadcasted as part of the audio ID.

A transmitter unit may comprise one or more antennas. A transmitter unit may be configured to stream a plurality of audio streams simultaneously. This may be achieved e.g. by a transmitter unit comprising a plurality of antennas.

The configuration data may comprise audio ID or parts thereof. In particular, the configuration data may contain information identifying a transmitter unit transmitting the requested audio stream (transmitter ID). Alternatively or additionally the configuration data may contain information of a group of transmitters (transmitter group ID), e.g. to enable a hearing device to select the optimum audio stream (transmitter), such as the transmitter providing the audio stream with the best signal to noise ratio.

Hearing systems may be different, depending on e.g. model or type. Therefore the configuration data may comprise first configuration data for a first hearing system model or type and second configuration data for a second hearing system model or type. The hearing system may thus choose the configuration data suitable for the particular hearing system. The configuration data may comprise at least third and/or fourth configuration data suitable for different hearing systems/models. Transmittal by default of more than one configuration data may provide support for several types or models of hearing systems without requiring the hearing system to transmit additional information to receive a suitable configuration data. Thereby simple request data are enabled.

Transmitting configuration data from the communication unit to the hearing system may be performed in several different ways.

For example, the communication unit may comprise a wireless transmitter for transmitting the configuration data to a hearing device and/or an accessory device of the hearing system. The wireless transmitter may be configured to transmit the configuration data to a hearing device or an accessory device of the hearing system. Alternatively or additionally, the communication unit may comprise a near field communication device configured for transmitting configuration data based on the request indicative of an audio track to the hearing system. The communication unit may comprise a web server adapted to transmit the configuration data to a hearing device and/or an accessory device of the hearing system.

Several other possibilities of transmitting the configuration data are present e.g. Bluetooth transfer or by use of an accessory device such as a hearing device remote control or a smartphone.

The communication unit may comprise a near field communication device configured for transmitting configuration data to a near field communication device of a hearing system. When the hearing system is in close proximity of the near field communication device of the communication unit, e.g. within 40 cm or within 20 cm or within 15 cm or within 5 cm, a near field communication tag of the hearing system receives the configuration data transmitted by the near field communication device of the communication unit. The hearing device/system may configure receiver parameters corresponding to the received configuration data in order to receive at least one audio stream representative of the audio track requested. The near field communication device of the audio system may be configured to receive and/or send configuration data at a frequency in the range from 13 MHz to 14 MHz.

The communication unit may comprise a wireless transceiver or transmitter, thus allowing the transmittal of configuration data to be performed using a wireless protocol.

In an exemplary communication unit, the configuration data may be transmitted wirelessly at one or more frequencies, e.g. in the range from 2.4 GHz to 2.5 GHz, in the range from 800 MHz to 1 GHz, in the range from 3.6 GHz to 3.7 GHz, in the range from 4.9 GHz to 5.9 GHz and/or in the range from 13 MHz to 14 MHz.

The communication unit may comprise a unit allowing transmitting configuration data by sending a text message, such as an SMS or email, to a mobile phone of the hearing system. Accordingly, the request may comprise a phone number and/or an email address.

The radio system may comprise a radio system control unit connected to the transmitter units and configured to control the transmitter units. The radio system control unit may further be connected to the communication unit to enable the communication unit to obtain information regarding the audio streams from the radio system.

The radio system control unit may be configured to determine configuration of each of the transmitter units, and decide which audio stream data to stream from which unit. Further the radio system control unit may control the audio ID to be transmitted as part of the audio stream, e.g. by sending a control signal to the respective transmitters.

The request indicative of an audio track, e.g. received at the communication unit, may be received from different sources depending on the audio system in question. The audio system may comprise a user interface unit connected to the communication unit. The user interface unit may be configured to receive a request indicative of at least one audio track and transmit the received request to the communication unit. The user interface unit may receive the request from a user of the audio system. The user interface may comprise one or more of a touchscreen, a keyboard, a mouse. The user interface may comprise a monitor or other display, including LED display, plasma screen, OLED display.

Alternatively or additionally the communication unit may receive the request from the hearing system or a user via e.g. the internet, a local area network, a phone line or a near field communication device.

In an exemplary audio system, the request indicative of at least one audio track may be transmitted to the communication unit by a user sending a text message such as an SMS containing the request.

The request indicative of at least one audio track may comprise hearing system data. The hearing system data may contain information of the hearing system such as model of the hearing device, type of hearing device, if there is an accessory device, type of accessory device, phone number and email. This may allow the audio system to transmit the configuration data in several ways. It may also provide the audio system with the possibility to transmit configuration data specific to the hearing system from which the request was received.

The audio system may comprise a database unit configured for storing or comprising audio track, audio stream data and/or audio ID. The database unit may comprise configuration data for the radio system, e.g. in the form of a lookup table.

The database unit may be connected to the communication unit. Upon receiving a request indicative of an audio track, e.g. at the communication unit, determining configuration data for the hearing system may comprise searching the database unit for configuration data corresponding to the requested audio track.

The database unit may be connected to the radio system, for example via the radio system control unit. The radio system may transmit data to the database unit containing information of the current state of each transmitter unit. Information transmitted from the radio system to the database unit may for example contain information on audio streams being currently transmitted, audio ID, audio group ID, transmitter ID, transmitter group ID, etc.

Alternatively or additionally the database unit may be configured for storing or comprise radio system configuration data. Thus, the radio system may retrieve data, from the database unit, indicative of contents to be transmitted at the transmitter units.

The database unit may also be connected to the user interface unit. The user interface unit may transmit data to the database unit, indicative of controlling the transmitter units of the radio system. The radio system may then retrieve information from the database unit on e.g. audio stream, audio ID, audio group ID etc. to transmit from the transmitter units.

The communication unit may also or alternatively be configured to transmit configuration data based on the request indicative of at least one audio track to an accessory device of the hearing system. Communication between the accessory device and the communication unit of the audio system may be via the internet, a phone line, a local area network or other techniques. The accessory device may subsequently be able to transfer the configuration data to the hearing device, thus enabling the hearing device to receive at least one audio stream representative of the requested audio track and play the audio track represented by the received audio stream.

The accessory device may be e.g. a mobile phone, a tablet computer, a smart phone, a hearing device remote control unit or a key card.

The method for operating an audio system for transmitting wireless audio streams may comprise transmitting at least one or a plurality of wireless audio streams with respective audio ID from a transmitter unit of the radio system. The method comprises receiving a request indicative of at least one audio track and transmitting configuration data based on the request for at least one audio track to at least one hearing system.

Receiving the request indicative of at least one audio track may comprise receiving a request indicative of at least one audio track at the communication unit.

The configuration data may comprise at least a part of audio ID of an audio stream representative of the requested audio track.

In an exemplary method, the radio system assigns audio ID to each audio stream. The radio system transmits the audio ID to the communication unit. When the communication unit receives a request indicative of at least one audio track, the communication unit transmits configuration data based on the request indicative of at least one audio track to a hearing system. The hearing system receives the configuration data, configures the hearing device according to the configuration data, and receives the corresponding audio stream from the transmitter unit of the radio system, thus enabling playback of the audio track represented by the audio stream data.

The method may comprise transmitting the configuration data from the communication unit to the hearing system via a near field communication device in the communication unit and a near field communication device in the hearing system.

In an exemplary method, transmitting the configuration data may be achieved by having the hearing system in close proximity to the near field communication device of the communication unit. A choice of a plurality of near field communication devices of the communication unit may serve as a way of selecting the audio track to request.

Transmitting configuration data to the hearing system may comprise transmitting configuration data to an accessory device of the hearing system, such as e.g. a mobile phone, a tablet computer, a smart phone, a hearing device remote control unit or a key card.

In an exemplary method, the communication unit transmits the configuration data to an accessory device, e.g. via a phone line, over the internet, via a local area network or via a near field communication device. The accessory device is then able to transmit the configuration data to the hearing device. Hereby, a power consuming pairing procedure between the hearing device and the audio system is avoided or at least simplified.

The audio stream may be transmitted at selected frequencies e.g. at a frequency in the range from 2.4 GHz to 2.5 GHz or at a frequency in the range from 800 MHz to 1 GHz. Other suitable frequencies may be in the range from 3.6 GHz to 3.7 GHz and/or in the range from 4.9 GHz to 5.9 GHz.

Figure 1:
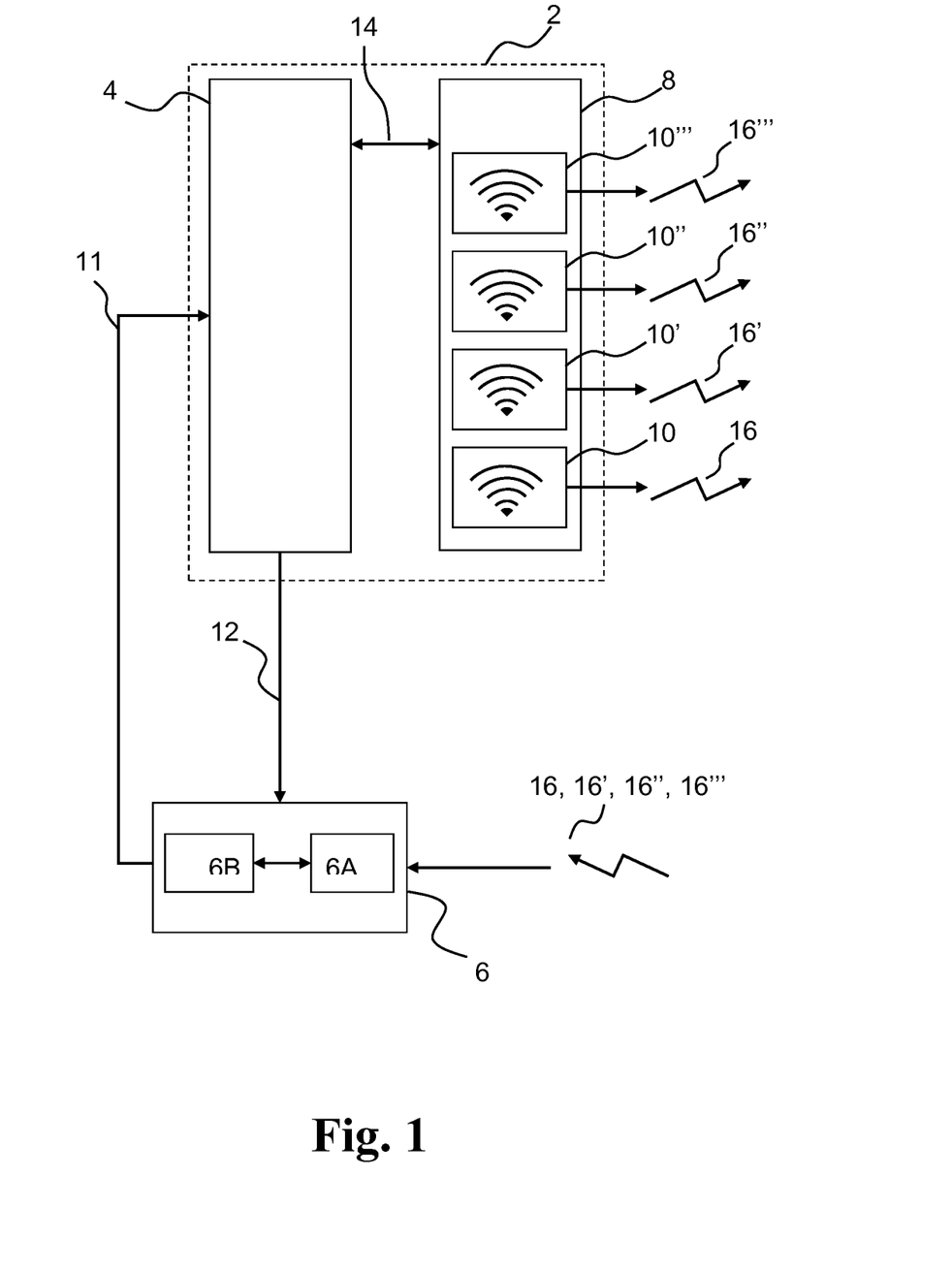
FIG. 1 schematically illustrates an exemplary audio system and a hearing system, FIG. 2 schematically illustrates an exemplary audio system and a hearing system, FIG. 3 schematically illustrates an exemplary audio system and a hearing system, FIG. 4 schematically illustrates an exemplary audio system and a hearing system.

FIG. 1 schematically illustrates an exemplary audio system 2 for transmitting wireless audio streams to a hearing system 6. The hearing system 6 comprises a hearing device 6A and optionally an accessory device 6B. The audio system 2 comprises a radio system 8 comprising a plurality of transmitter units 10, 10', 10", 10'''. Each transmitter unit 10, 10', 10", 10''' is configured to transmit an audio stream 16, 16', 16", 16''' with audio ID indicative of the audio stream 16, 16', 16", 16'''. The audio system 2 further comprises a communication unit 4 for transmitting configuration data 12 to the hearing system 6. The communication unit 4 is configured to receive a request 11 indicative of an audio track from the hearing system 6. The communication unit 4 is configured to determine configuration data for the hearing system 6 based on the request 11 indicative of an audio track. The communication unit 4 is further configured to transmit the configuration data 12 to the hearing system 6, allowing the hearing system 6 to configure for receipt of an audio stream representative of the audio track indicated in the request. The request 11 and the configuration data 12 may be transmitted directly between the communication unit 4 and the hearing system 6. One or both of the request 11 and the configuration data 12 may be transmitted via a network (not shown), e.g. the internet, or a local area network.

The hearing system 6 receives audio streams 16, 16', 16", 16''' transmitted from the respective transmitter units 10, 10', 10", 10'''. The configuration data 12 from the communication unit 4 enables the hearing system 6 to configure the receiver/transceiver of the hearing device 6A in order to receive and select the audio stream representative of the audio track requested in a simple and power efficient way. Thus the hearing device 6A is enabled to play the requested audio track, e.g. after signal processing to compensate for the hearing loss or disability of the hearing device user.

The communication link 14 between the radio system 8 and the communication unit 4, enables the communication unit to obtain radio system information, thereby determining configuration data corresponding to the audio streams 16, 16', 16", 16''', of the transmitter units 10, 10', 10", 10''' and the request indicative of at least one audio track 11, received from the hearing system.

The hearing system 6 may comprise at least one hearing device 6A and optionally an accessory device 6B such as a mobile phone, a tablet computer, a smart phone, a hearing device remote control unit or a key card. The accessory device 6B and the hearing device 6A may transmit data between each other. Transmission of data between the accessory device 6B and the hearing device 6A may be performed wirelessly, using e.g. bluetooth, WiFi or near field communication.

The communication unit 4 may transmit configuration data 12 and/or receive request indicative of at least one audio track 11, via a wireless method.

The audio system 2 may optionally further comprise one or more of a near field communication device, a user interface unit, a radio system control unit and/or a database unit. Audio systems comprising these units are exemplified in the exemplary audio systems illustrated by example in FIGS. 2-4.

Figure 2:
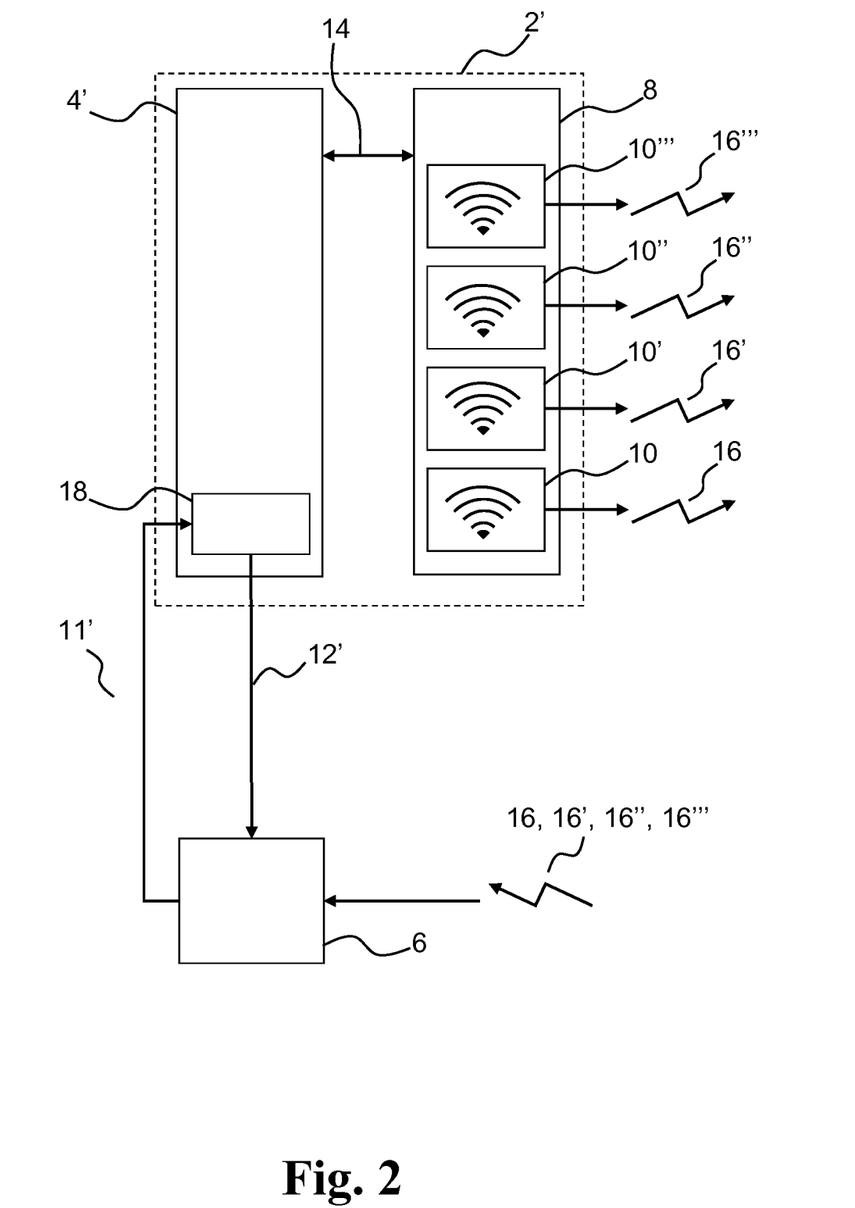

FIG. 2 schematically illustrates an exemplary audio system. The audio system 2' comprises the same features as the audio system 2 shown in FIG. 1. The communication unit 4' comprises a near field communication device 18 for receiving and/or transmitting short range data to and/or from the hearing system 6. The communication unit 4' receives a request 11' indicative of an audio track from the hearing system 6 via the near field communication device 18. The communication unit 4' transmits configuration data 12', based on the received request 11', via the near field communication device 18, to the hearing system 6. Then the hearing system 6 may be configured according to the configuration data 12', and the hearing system 6 is enabled to play the requested audio track.

Figure 3:
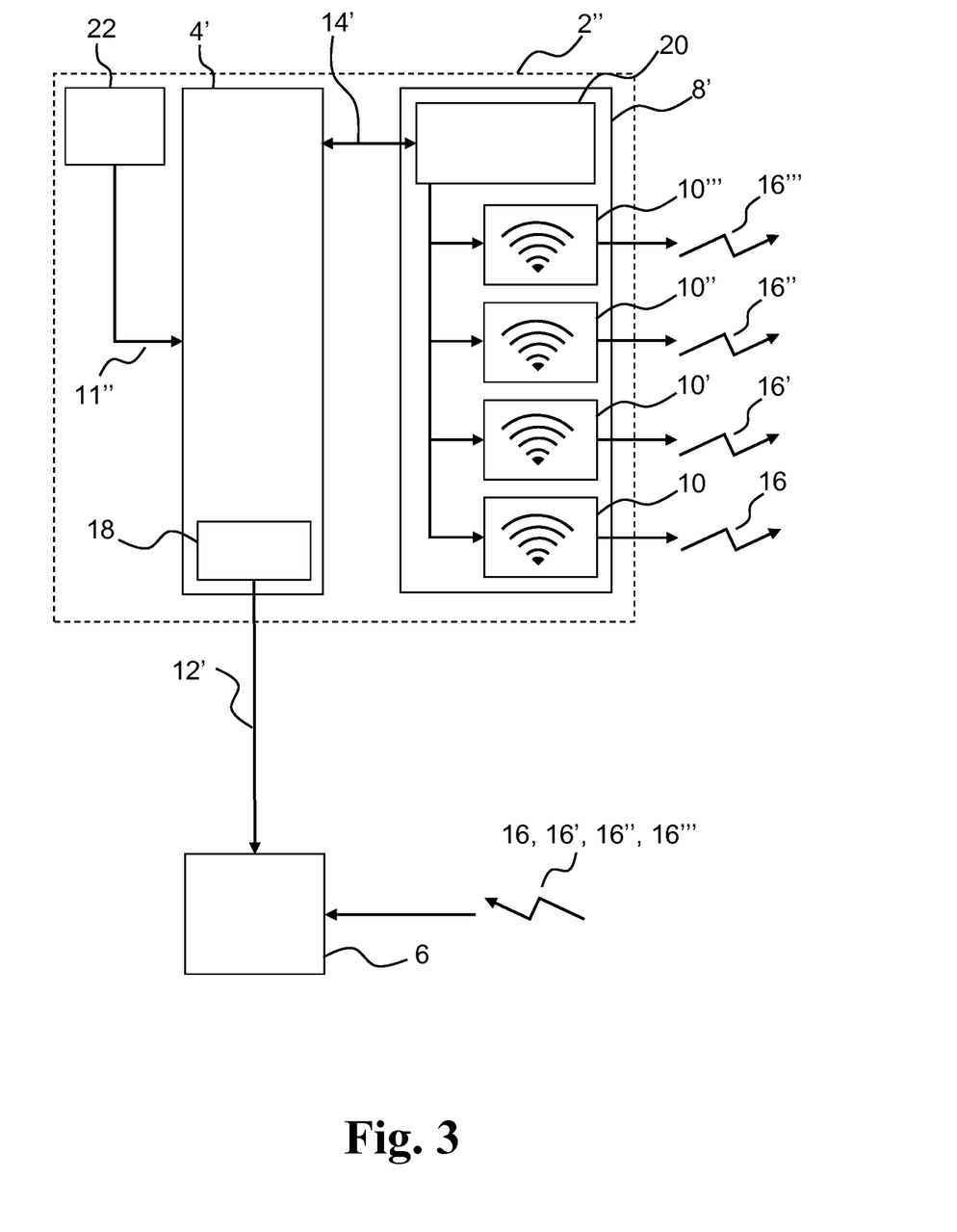

FIG. 3 schematically illustrates an exemplary audio system. The audio system 2" comprises the same features as the audio system 2' shown in FIG. 2. The audio system 2" comprises an optional user interface unit 22, and the radio system 8' further comprises an optional radio system control unit 20. The radio system control unit 20 is configured to control the transmitter units 10, 10', 10", 10''', e.g. controlling for each transmitter unit 10, 10', 10", 10''' which audio track to stream, which audio ID and audio group ID to transmit etc. The transmitter units 10, 10', 10", 10''' of the radio system 8', each transmits an audio stream 16, 16', 16", 16''' with audio ID controlled by the radio system control unit 20. The communication unit 4' receives a request indicative of an audio track 11" from the user interface unit 22. The communication unit 4' obtains radio system information 14' from the radio system control unit 20 of the radio system 8'. The communication unit 4' transmits configuration data 12', based on the received request 11" and the radio system information 14', via the near field communication device 18, to the hearing system 6. Then the hearing system 6 may be configured according to the configuration data 12', and the hearing system 6 is enabled to play the requested audio track. It is to be understood that the near field communication device 18 is an example of a transmitter. Other exemplary transmitters may include a Bluetooth transmitter (2.4-2.5 GHz). In exemplary communication units, the configuration data are sent via the internet, i.e. the communication unit may comprise a web interface (not shown).

Figure 4:
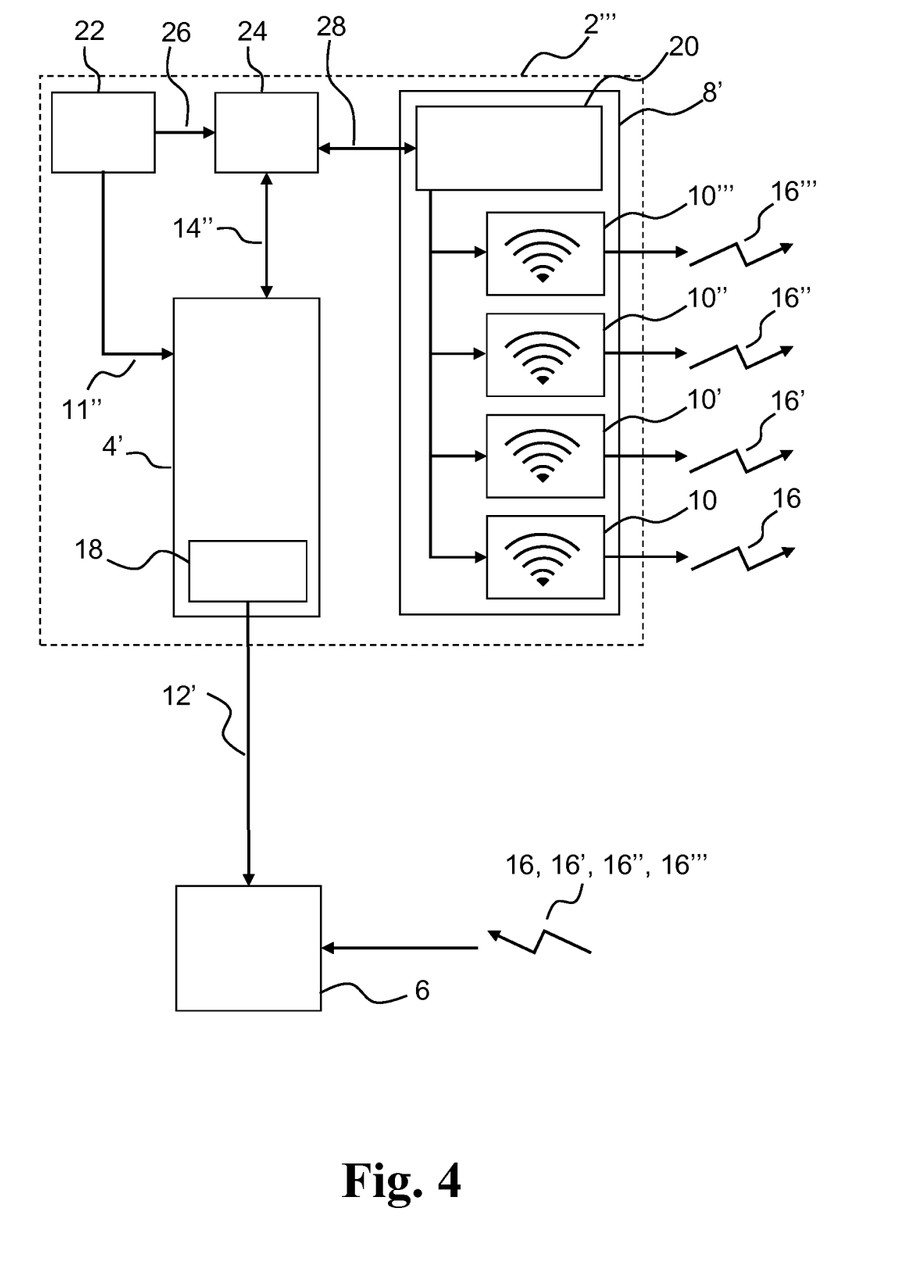

FIG. 4 schematically illustrates an exemplary audio system. The audio system 2''' comprises the same features as the audio system 2" shown in FIG. 3. The audio system 2''' comprises an optional database unit 24. The user interface unit 22 transmits configuration data 26 to the database unit 24 indicative of audio streams to transmit at each transmitter unit 10, 10', 10", 10''', e.g. audio track, audio ID and audio group ID. The radio system control unit 20 is obtaining radio system configuration data 28 from the database unit 24 and controls the transmitter units 10, 10', 10", 10''' of the radio system according to the radio system configuration data 28. Upon receipt of a request indicative of an audio track 11", the communication unit 4' obtains relevant information 14" from the database unit 24. The communication unit 4' transmits configuration data 12', based on the received request 11" and the information 14, via the near field communication device 18 or other transmitter, to the hearing system 6. Then the hearing system 6 may be configured according to the configuration data 12', and the hearing system 6 is enabled to play the requested audio track.

Figure 5:
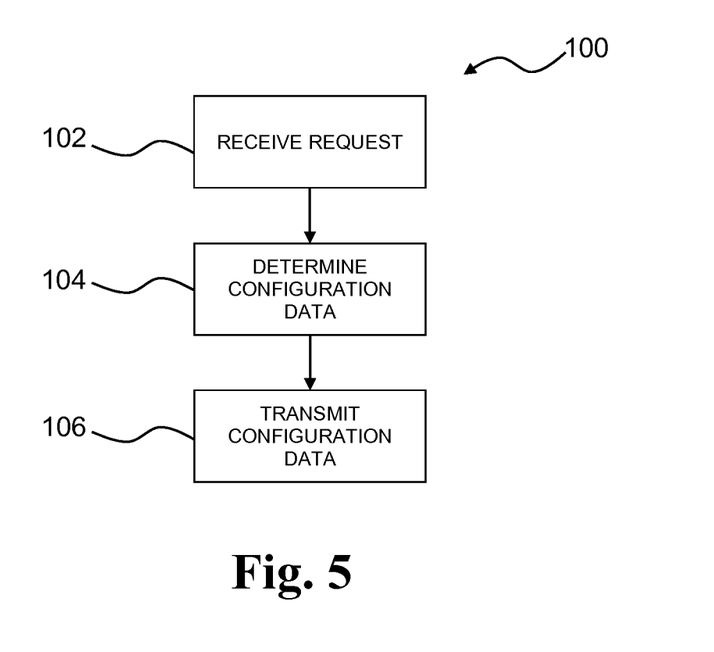
FIG. 5 is a flow diagram of an exemplary method according to some embodiments.

FIG. 5 shows a flow diagram of an exemplary method 100 for operating an audio system for transmitting wireless audio streams to a hearing system. The audio system comprises a communication unit and a radio system. The radio system comprises a plurality of stationary transmitter units for transmitting at least a first audio stream with first audio ID indicative of the first audio stream. The method 100 comprises receiving a request indicative of at least one audio track 102; determining configuration data for the hearing system 104 based on the request indicative of at least one audio track; and transmitting the configuration data to the hearing system 106 for allowing the hearing system to receive at least one audio stream representative of the audio track indicated in the request.

The request 102 may comprise data enabling the audio system to identify at least one audio stream representative of the audio track indicated in the request. The request may comprise or indicate e.g. an audio track for a specific movie starting at a specific time, or all calls in an airport regarding a certain flight. Further the request may comprise hearing system data, e.g. model of the hearing device, type of hearing device, if there is an accessory device, type of accessory device, phone number and/or email. The request 102 may be transmitted by sending a text message such as an SMS or an email or it may be transmitted via the internet, a local area network, a Bluetooth transceiver and/or a near field communication device.

The determination of configuration data 104 comprises retrieving information about audio streams from the radio system and/or from a database of the audio system. The configuration data are based on the received request and corresponding information on audio streams. The determination may comprise utilizing hearing system data received as part of the request 102, allowing configuration data to be mapped specifically to the hearing device and/or hearing system in question.

Transmitting the configuration data to the hearing system 106 comprises transmitting data to a hearing device of the hearing system or to an accessory device of the hearing system. The method of transmitting the configuration data 106 may comprise sending a text message such as an SMS or an email or the configuration data may be transmitted via the internet, a local area network, a Bluetooth transceiver and/or a near field communication device.

The method of transmitting the configuration data 106 may be chosen based on the content of the request 102. Thus, as an example, if the request 102 comprises an email address, the configuration may be send to the email address. If the request 102 comprises information indicating several methods for transmitting the configuration data 106, the method for transmitting the configuration data 106, may be selected from a prioritized list of the methods comprised in the request 102.

The configuration data transmitted to the hearing system enables the hearing system to configure the receiver/transceiver of the hearing device of the hearing system in order to receive and select an audio stream representative of the requested audio track in a simple and power efficient way. Thus the hearing device is enabled to play the requested audio track, e.g. after signal processing to compensate for the hearing loss or disability of the hearing device user.

The configuration data transmitted 106, may comprise audio ID or parts thereof. In particular, the configuration data may contain information identifying a transmitter unit transmitting the requested audio stream (transmitter ID). Alternatively or additionally the configuration data may contain information of a group of transmitters (transmitter group ID) or a group of audio streams (audio group ID), e.g. to enable a hearing device to select the optimum audio stream and/or transmitter, such as the transmitter providing the best signal to noise ratio.

Although particular embodiments have been shown and described, it will be understood that they are not intended to limit the claimed inventions, and it will be obvious to those skilled in the art that various changes and modifications may be made. The specification and drawings are, accordingly, to be regarded in an illustrative rather than restrictive sense. The claimed inventions are intended to cover alternatives, modifications, and equivalents.

LIST OF REFERENCES 2, 2', 2", 2'" audio system
4, 4' communication unit
6 hearing system
6A hearing device
6B accessory device
8, 8' radio system
10 first transmitter unit
10' second transmitter unit
10" third transmitter unit
10'" fourth transmitter unit
11, 11', 11" request indicative of an audio track
12, 12' configuration data for the hearing system
14, 14', 14" obtaining radio system information at the communication unit
16 first audio stream
16' second audio stream
16" third audio stream
16'" fourth audio stream
18 near field communication device
20 radio system control unit
22 user interface unit
24 database unit
26 transmitting configuration data to the database unit
28 obtaining radio system configuration data at the radio system
100 method for operating an audio system
102 receive request indicative of at least one audio track
104 determine configuration data
106 transmit configuration data

The invention claimed is:

1. A phone comprising:
a processing unit configured to provide an interfacing function to interconnect a hearing aid and an audio system having a plurality of transmitters, wherein the processing unit is configured to obtain configuration data from the audio system transmitted based on a request for an audio track; and
a communication device configured to transfer the configuration data to the hearing aid to enable the hearing aid to receive a desired audio stream that is associated with the requested audio track, the desired audio stream being one of a plurality of audio streams transmitted by the audio system, wherein other one(s) of the plurality of audio streams is associated with other audio track(s) that is different from the requested audio track;
wherein the configuration data comprises information identifying one of the transmitters that is configured to transmit the desired audio stream.

2. The phone of claim 1, wherein the phone comprises a smart phone.

3. The phone of claim 1, wherein the phone and the hearing device form parts of a hearing system.

4. The phone of claim 1, wherein the request comprises information regarding a phone type, a hearing aid identification, a telephone number, or a combination of two or more of the foregoing.

5. The phone of claim 1, wherein the information is for configuring the hearing aid.

6. The phone of claim 1, wherein the information is configured to identify the one of the transmitters by identifying an optimum audio stream from a plurality of audio streams.

7. The phone of claim 1, wherein the information is for identifying the one of the transmitters as the optimal transmitter.

8. A method for operating an audio system for transmitting wireless audio streams to a hearing system, the wireless audio streams comprising a first audio stream and a second audio stream, the audio system comprising a communication unit and a radio system comprising a plurality of transmitter units, the plurality of transmitter units including a first transmitter unit and a second transmitter unit, the first transmitter unit configured for transmitting at least the first audio stream with first audio identification data indicative of the first audio stream, the second transmitter unit configured for transmitting at least the second audio stream with second audio identification data indicative of the second audio stream, the method comprising:
receiving a request indicative of an audio track;
determining configuration data for the hearing system based on the request indicative of the audio track; and transmitting the configuration data to the hearing system for allowing the hearing system to receive a desired audio stream that is associated with the audio track indicated in the request, the desired audio stream being one of a plurality of audio streams including the first audio stream and the second audio stream, wherein other one(s) of the plurality of audio streams is associated with other audio track(s) that is different from the audio track indicated in the request;

wherein the act of transmitting the configuration data to the hearing system comprises transmitting the configuration data to a phone in the hearing system;

wherein the configuration data comprises information identifying one of the transmitter units that is configured to transmit the desired audio stream associated with the audio track indicated in the request.

9. The method according to claim 8, wherein the act of transmitting the configuration data to the hearing system comprises transmitting the configuration data at a frequency anywhere from 2.4 GHz to 2.5 GHz, at a frequency anywhere from 800 MHz to 1 GHz, and/or at a frequency anywhere from 13 MHz to 14 MHz.

10. The method according to claim 8, wherein the information comprises at least a part of an audio identification data of one of the first and second audio streams representative of the audio track indicated in the request.

11. The method according to claim 8, wherein the information comprises one or more of transmitter identification data, transmitter group identification data, audio group identification data, audio type identification data, and audio protocol identification data.

12. The method according to claim 8, wherein the configuration data comprises first configuration data for a first hearing system model or type, or second configuration data for a second hearing system model or type.

13. The method according to claim 8, wherein the request indicative of the audio track comprises hearing system data.

14. The method of claim 8, wherein the first transmitter unit is at the first auditorium, and the second transmitter unit is at the second auditorium.

15. The method of claim 8, wherein the hearing system comprises a hearing aid having a hearing loss compensation processor, the hearing aid being in communication with the phone.

16. The method of claim 15, wherein the hearing aid is configured to receive the first audio stream or the second audio stream.

17. An audio system for transmitting wireless audio streams to a hearing system, comprising:
a radio system comprising a plurality of stationary transmitter units, the plurality of stationary transmitter units comprising a first stationary transmitter unit for a first auditorium and a second stationary transmitter unit for a second auditorium, the first stationary transmitter unit configured to transmit at least a first audio stream with first audio identification data indicative of the first audio stream, the second stationary transmitter unit configured to transmit at least a second audio stream with second audio identification data indicative of the second audio stream; and
a communication unit for transmitting configuration data for the hearing system, wherein the communication unit is configured to:
receive a request indicative of an audio track;
determine configuration data for the hearing system based on the request indicative of the audio track; and transmit the configuration data to the hearing system for allowing the hearing system to receive a desired audio stream that is associated with the audio track indicated in the request, the desired audio stream being one of a plurality of audio streams including the first audio stream and the second audio stream, wherein other one(s) of the plurality of audio streams is associated with other audio track(s) that is different from the audio track indicated in the request;

wherein the communication unit is configured to transmit the configuration data to a phone in the hearing system; and wherein the configuration data comprises information identifying one of the stationary transmitter units that is configured to transmit the desired audio stream associated with the audio track indicated in the request.

18. The audio system according to claim 17, wherein the communication unit comprises a wireless transmitter for transmitting the configuration data to a hearing device of the hearing system.

19. The audio system according to claim 17, wherein the communication unit comprises a near field communication device configured to transmit the configuration data based on the request indicative of the audio track to the hearing system.

20. The audio system according to claim 17, wherein the radio system comprises a radio system control unit connected to the transmitter units, and wherein the radio system control unit is configured to control the transmitter units.

21. The audio system according to claim 17, further comprising a user interface unit connected to the communication unit, wherein the user interface unit is configured to receive the request indicative of the audio track, and transmit the received request to the communication unit.

22. The audio system according to claim 17, wherein the communication unit is configured to transmit the configuration data based on the request indicative of the audio track to the phone.

23. The audio system according to claim 17, wherein at least one of the stationary transmitter units is configured to transmit one of the first and second audio streams in a form of electromagnetic signals representative of the audio track.

24. The audio system of claim 17, wherein the first stationary transmitter unit is at the first auditorium, and the second stationary transmitter unit is at the second auditorium.

25. The audio system of claim 17, wherein the hearing system comprises a hearing aid having a hearing loss compensation processor, the hearing aid being in communication with the phone.

26. The audio system of claim 25, wherein the hearing aid is configured to receive the first audio stream or the second audio stream.

27. An audio system for transmitting wireless audio streams to a hearing system, comprising:
a radio system comprising a plurality of stationary transmitter units, the plurality of stationary transmitter units comprising a first stationary transmitter unit for a first auditorium and a second stationary transmitter unit for a second auditorium, the first stationary transmitter unit configured to transmit at least a first audio stream with first audio identification data indicative of the first audio stream, the second stationary transmitter unit configured to transmit at least a second audio stream with second audio identification data indicative of the second audio stream; and a communication unit for transmitting configuration data for the hearing system, wherein the communication unit is configured to:
receive a request indicative of an audio track;
determine configuration data for the hearing system based on the request indicative of the audio track; and
transmit the configuration data to the hearing system for allowing the hearing system to receive a desired audio stream that is associated with the audio track indicated in the request, the desired audio stream being one of a plurality of audio streams including the first audio stream and the second audio stream, wherein other one(s) of the plurality of audio streams is associated with other audio track(s) that is different from the audio track indicated in the request;
wherein the hearing system comprises a hearing aid having a hearing loss compensation processor; and
wherein the configuration data comprises information identifying one of the stationary transmitter units that is configured to transmit the desired audio stream associated with the audio track indicated in the request.

28. The audio system according to claim 27, wherein the hearing system comprises an accessory device, and wherein the accessory device comprises a mobile phone, a tablet computer, a smart phone, a hearing device remote control unit, or a key card.

\* \* \* \* \*